(12) United States Patent
Wang et al.

(10) Patent No.: US 10,296,048 B1
(45) Date of Patent: May 21, 2019

(54) PORTABLE ELECTRONIC DEVICE WITH DUAL DISPLAYS AND A HINGE STRUCTURE

(71) Applicant: HTC CORPORATION, Taoyuan (TW)

(72) Inventors: Chi-Jer Wang, Taoyuan (TW); Yi Cheng Lin, Taoyuan (TW); I-Cheng Chuang, Taoyuan (TW); Chi-Hung Lin, Taoyuan (TW); Kuan-Ku Kuo, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 15/920,566

(22) Filed: Mar. 14, 2018

(51) Int. Cl.
G06F 1/16 (2006.01)

(52) U.S. Cl.
CPC .......... *G06F 1/1649* (2013.01); *G06F 1/1654* (2013.01); *G06F 1/1681* (2013.01)

(58) Field of Classification Search
CPC ..... G06F 1/1649; G06F 1/1654; G06F 1/1681
See application file for complete search history.

(56) References Cited

U.S. PATENT DOCUMENTS

| | | | | |
|---|---|---|---|---|
| 7,924,554 B2* | 4/2011 | Shen | .................... | H04M 1/0237 16/223 |
| 2010/0118475 A1* | 5/2010 | Lee | .................... | H04M 1/0237 361/679.01 |
| 2010/0118487 A1* | 5/2010 | Ou | .................... | H04M 1/0237 361/679.55 |
| 2010/0149733 A1* | 6/2010 | Luke | .................... | G06F 1/1616 361/679.01 |
| 2010/0218343 A1* | 9/2010 | Cheng | .................... | G06F 1/1616 16/297 |

(Continued)

FOREIGN PATENT DOCUMENTS

| | | |
|---|---|---|
| CN | 103259886 B | 4/2016 |
| TW | M251406 U | 11/2004 |

(Continued)

OTHER PUBLICATIONS

Office Action issued in corresponding Taiwan Patent Application No. 107115598 dated Dec. 13, 2018 (and its English summary).

*Primary Examiner* — Hoa C Nguyen
*Assistant Examiner* — Keith DePew
(74) *Attorney, Agent, or Firm* — McClure, Qualey & Rodack, LLP

(57) ABSTRACT

A portable electronic device, including a first unit, a second unit and a hinge structure, is disclosed. The first unit includes a first display portion, a first back portion and a first receiving groove disposed on the first back portion. The second unit includes a second display portion and a second back portion selectively stacked with the first back portion. The hinge structure is disposed in the first receiving groove of the first unit and includes a fixing element disposed in the first receiving groove, a sliding element slidably disposed on the fixing element and a rotary element disposed on an outer side of the sliding element, wherein the second unit is pivoted to the rotary element via the second back portion. In this way, the hinge structure will not protrude outside the first and second units when the portable electronic device is in the folded status.

11 Claims, 17 Drawing Sheets

(56) References Cited

U.S. PATENT DOCUMENTS

| | | | | |
|---|---|---|---|---|
| 2010/0323770 A1* | 12/2010 | Chuang | ................ | G06F 1/1622 |
| | | | | 455/575.4 |
| 2011/0122555 A1* | 5/2011 | Yeh | ...................... | G06F 1/1616 |
| | | | | 361/679.01 |
| 2012/0162082 A1* | 6/2012 | Mori | .................... | G06F 1/1618 |
| | | | | 345/168 |
| 2015/0116917 A1* | 4/2015 | Aono | .................... | G06F 1/1681 |
| | | | | 361/679.04 |
| 2015/0244940 A1* | 8/2015 | Lombardi | .......... | H04N 5/23293 |
| | | | | 348/333.06 |
| 2016/0040462 A1* | 2/2016 | Nakamura | .......... | H04M 1/0247 |
| | | | | 361/679.27 |

FOREIGN PATENT DOCUMENTS

| | | |
|---|---|---|
| TW | M474308 U | 3/2014 |
| TW | 201634301 | 10/2016 |
| TW | M551804 | 11/2017 |

\* cited by examiner

PORTABLE ELECTRONIC DEVICE WITH DUAL DISPLAYS AND A HINGE STRUCTURE

BACKGROUND OF THE INVENTION

Field of the Invention

The present invention provides a portable electronic device, and in particular, provides a portable electronic device that comprises dual displays.

Descriptions of the Related Art

Portable electronic devices that are currently available on the market (e.g., mobile phones, tablet computers) are trending towards the development of a larger display size to allow for more comfortable viewing. However, in consideration of the operability and portability of portable electronic devices, the increase in the size of the display is limited to a certain degree. For this issue, some manufacturers have proposed portable electronic devices comprising dual displays that are connected together via a hinge. In this way, the two displays can be folded for portability and then unfolded for simultaneous viewing.

However, when the portable electronic device is in the folded status, the hinge will protrude outside of the display, and this affects the appearance of the device and increases the size of the device. On the other hand, when the portable electronic device is in the unfolded status, the two displays are separated by a hinge which creates an obvious gap therebetween which does not allow the displays to be arranged side by side. Therefore, when the users watch the images commonly displayed by the two displays, the viewing experience tends to be compromised by the gap.

Accordingly, an urgent need exists in the art to improve the aforesaid drawbacks.

SUMMARY OF THE INVENTION

An objective of the present invention is to provide a portable electronic device which comprises a first unit, a second unit and a hinge structure. The hinge structure does not protrude outside the first unit and the second unit when the first unit and the second unit are stacked together. Moreover, the first unit and the second unit may be arranged side by side, and the hinge structure will not increase the gap between the first unit and the second unit.

To achieve the aforesaid objective in a portable electronic device provided in the present invention, the first unit comprises a first display portion, a first back portion and a first receiving groove, while the first receiving groove is disposed on the first back portion. The second unit comprises a second display portion and a second back portion, while the second back portion is selectively stacked with the first back portion. A hinge structure is disposed in the first receiving groove of the first unit and comprises a fixing element, a sliding element and a rotary element. The fixing element is disposed in the first receiving groove, the sliding element is slidably disposed on the fixing element, and the rotary element is disposed on the outer side of the sliding element, wherein the second unit is pivoted to the rotary element via the second back portion.

In an embodiment, the hinge structure further comprises an elastic restoring element with one end disposed on the fixing element and the other end disposed on the inner side of the sliding element to provide the sliding element with an elastic restoring force towards the fixing element.

In an embodiment, the elastic restoring element comprises a spring, an elastic piece or an elastic string.

In an embodiment, the first back portion comprises a first raised region on which the first receiving groove is disposed, while the second back portion comprises a second raised region. When the first back portion and the second back portion are stacked together, the first raised region and the second raised region are disposed adjacent to each other to define a slide space therebetween.

In an embodiment, the first raised region comprises a first inclined surface while the second raised region comprises a second inclined surface. When the first back portion and the second back portion are stacked together, the first inclined surface and the second inclined surface face each other.

In an embodiment, the rotary element comprises a sleeve and a rotary shaft. The sleeve is disposed on the outer side of the sliding element. The rotary shaft is pivoted into the sleeve.

In an embodiment, the rotary element comprises a first rotary portion and a second rotary portion. The first rotary portion has one side thereof pivoted to the outer side of the sliding element and the other side thereof pivoted to one side of the second rotary portion. The second rotary portion pivots the other side thereof to the second back portion.

In an embodiment, the fixing element comprises a guide groove or a guide block to guide the sliding movement of the sliding element.

In an embodiment, the first receiving groove comprises a first receiving region and a second receiving region connected with each other. The fixing element is disposed in the first receiving region and the rotary element is selectively disposed in the second receiving region.

In an embodiment, the second unit further comprises a second receiving groove disposed on the second back portion. The rotary element is partly disposed in the second receiving groove.

In an embodiment, the first display portion and the second display portion each comprise a curved display edge.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
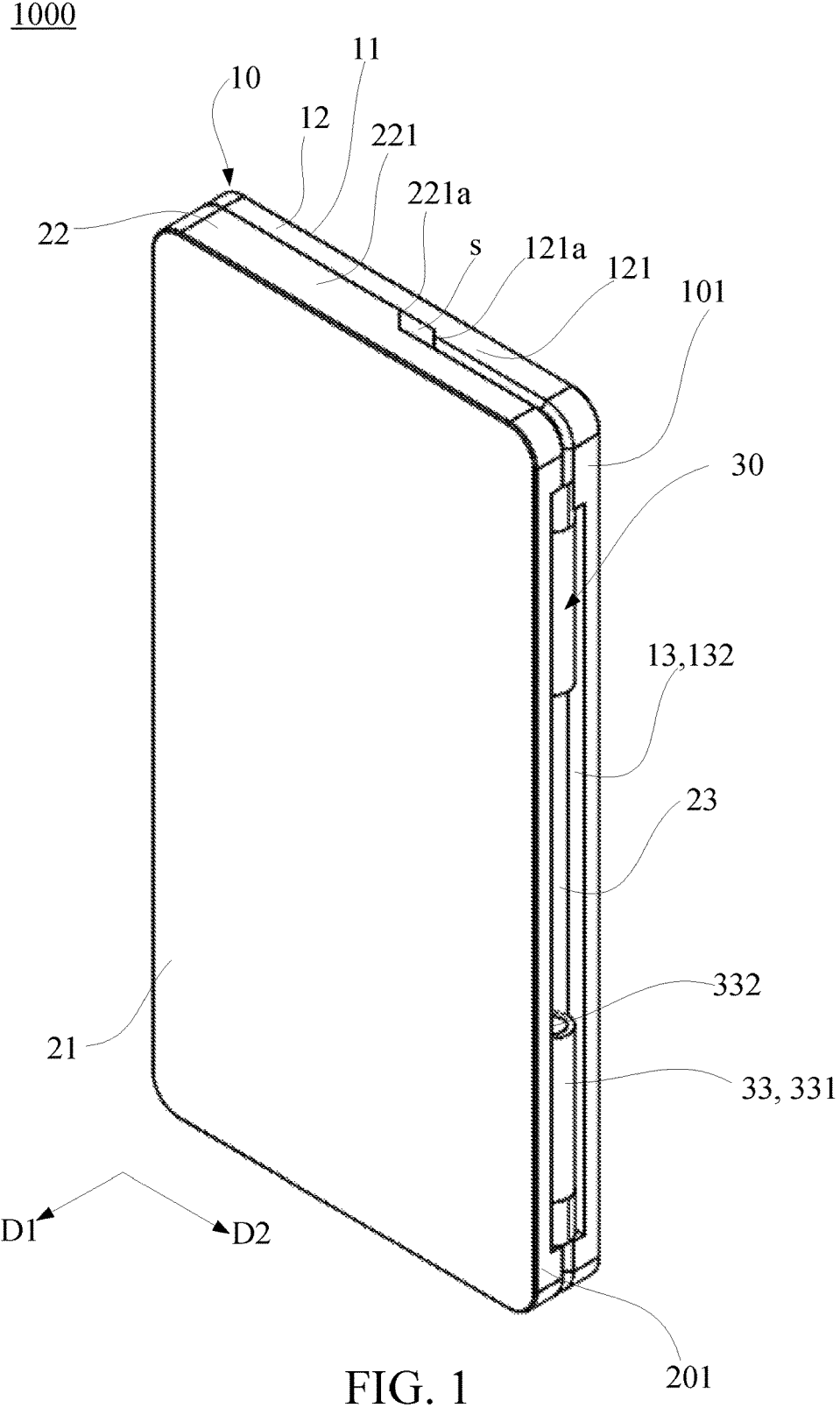
FIG. 1 is a perspective view of a portable electronic device in a folded status according to the preferred embodiment of the present invention.

Please refer to FIGS. 1 and 2A to 2C, which are respectively perspective views and an exploded view of a portable electronic device according to the preferred embodiment of the present invention. A portable electronic device 1000 comprises a first unit 10, a second unit 20 and one or more hinge structures 30. The technical contents of the aforesaid components will be described sequentially as follows.

The first unit 10 is provided with a display device, which comprises a first display portion 11, a first back portion 12 and one or more first receiving grooves 13. The first display portion 11 is a region of the display device that is used to display symbols or images. The first display portion 11 may comprise a display panel such as a liquid crystal display panel, an OLED display panel, a Micro LED display panel or the like, and may have the function of touch operation. The first display portion 11 and the first back portion 12 are respectively located at opposite sides of the first unit 10, and commonly (or each) comprise structures such as a housing, a frame or the like to define a receiving space in which a display panel, a battery, a circuit board or other electronic elements or the like are disposed. The first receiving groove 13 is disposed on the first back portion 12, and more specifically, the first receiving groove 13 is recessed in the first back portion 12 and is positioned closer to a connecting side 101 of the first unit 10 (i.e. the connecting side 101 is used to connect with a connecting side 201 of the second unit 20). Moreover, the first receiving groove 13 may open to the outside towards a thickness direction D1 (i.e., a normal direction of the first back portion 12) and a width direction D2 (i.e., a direction perpendicular to the thickness direction D1) of the first unit 10 to form an opening in each of the directions so that the hinge structure 30 can be installed in the first receiving groove 13.

Preferably, the first back portion 12 may comprise a first raised region 121 which is formed closer to the connecting side 101 of the first unit 10, and the first receiving groove 13 is recessed in the first raised region 121. The first back portion 12 having the first raised region 121 may provide the first unit 10 with a relatively large thickness at the connecting side 101 of the first unit 10 so that the hinge structure 30 can be disposed therein, and meanwhile, a larger receiving space within the first unit 10 is provided.

Figure 3A:
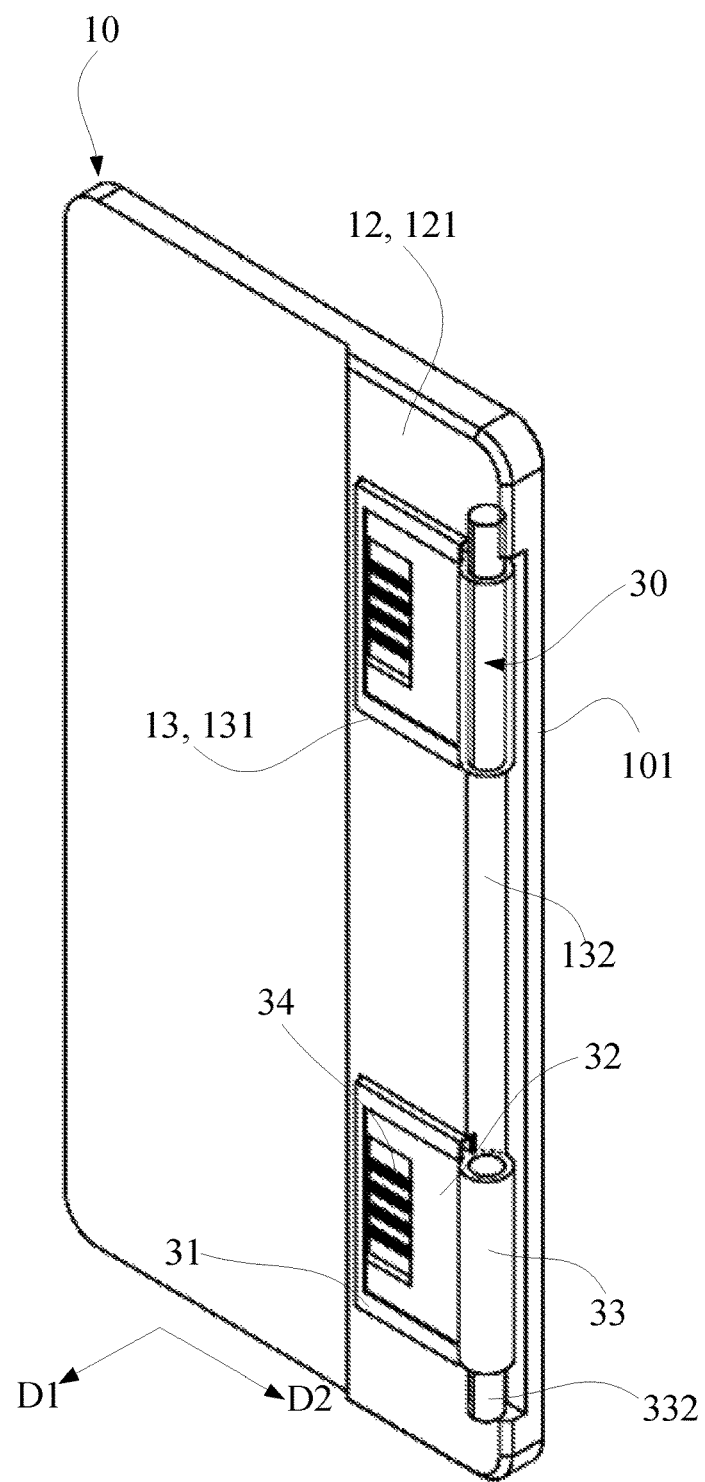
FIGS. 3A and 3B are schematic views of a first unit and a hinge structure of the portable electronic device of FIG. 1.

The first receiving groove 13 may be further divided into (i.e., comprise) a first receiving region 131 and a second receiving region 132 to receive different portions of the hinge structure 30. In detail, the first receiving region 131 is connected (communicates) with the second receiving region 132 along the width direction D2, and the side boundary of the second receiving region 132 may be aligned with the connecting side 101, i.e., extend to the connecting side 101, so that the first receiving groove 13 forms an opening on the connecting side 101 (as shown in FIG. 3A). A rotary element 33 of the hinge structure 30 that is described later may move to the outside of the connecting side 101 via the opening on the connecting side 101.

The second unit 20 is provided with another display device and comprises a second display portion 21 and a second back portion 22, which is similar to the first unit 10 in structure. The second display portion 21 is also a region of the second unit 20 that is used to display symbols or images, and may also have the function of touch operation. The second display portion 21 and the second back portion 22 are respectively located at opposite sides of the second unit 20 with a receiving space defined therebetween. The second back portion 22 is selectively stacked with the first back portion 12. That is, when the portable electronic device 1000 is in the folded status, the second back portion 22 is stacked with the first back portion 12; and when the portable electronic device 1000 is in the unfolded status, the second back portion 22 is not stacked with the first back portion 12. When the second back portion 22 is stacked with the first back portion 12, the first unit 10 and the second unit 20 are overlapping with each other in the thickness direction D1, and no gap exists between the first back portion 12 and the second back portion 22, or a predetermined gap exists at a certain portion therebetween.

Moreover, the second unit 20 may also comprise a second receiving groove 23. The second receiving groove 23 is disposed on the second back portion 22 and is located at the connecting side 201 of the second unit 20 to provide a space for receiving the hinge structure 30. The second back portion 22 is preferred to comprise a second raised region 221. The second raised region 221 is disposed away from the connecting side 201 (i.e., at the unfolded side 202 of the second unit 20). Accordingly, when the first back portion 12 is stacked with the second back portion 22, the first raised region 121 the second raised region 221 are disposed adjacent to each other to define a slide space S therebetween. That is, the first raised region 121 is beside the second raised region 221 along the width direction D2 and is not in contact with the second raised region 221.

Additionally, the sum of the width of the first raised region 121 and the width of the second raised region 221 is smaller than the overall width of the second back portion 22 and is also smaller than the overall width of the first back portion 12. The width of the first raised region 121 may be slightly larger than the overall width of the hinge structure 30, and the width of the second raised region 221 may be larger than the width of the first raised region 121. The thickness of the second raised region 221 may be equal to or different from the thickness of the first raised region 121. For example, in this embodiment, the second raised region 221 is thicker. Thus, when the first back portion 12 and the second back portion 22 are stacked together, the first raised region 121 does not come into contact with the second back portion 22, but the second raised portion 221 contacts the first back portion 12.

Moreover, the first raised region 121 and the second raised region 221 may define a first inclined surface 121a and a second inclined surface 221a respectively at portions where the first raised region 121 and the second raised region 221 are raised from the first back portion 12 or the second back portion 22. When the portable electronic device 1000 is in the folded status (the first back portion 12 and the second back portion 22 are stacked together), the first inclined surface 121a and the second inclined surface 221a face each other; and when the portable electronic device 1000 is to be unfolded, the slide space S enables the first back portion 12 and the second back portion 22 to slide relative to each other. At the end of the sliding movement, the first inclined surface 121a and the second inclined surface 221a may abut against each other, thereby achieving the function of blocking and guiding.

Figure 2A:
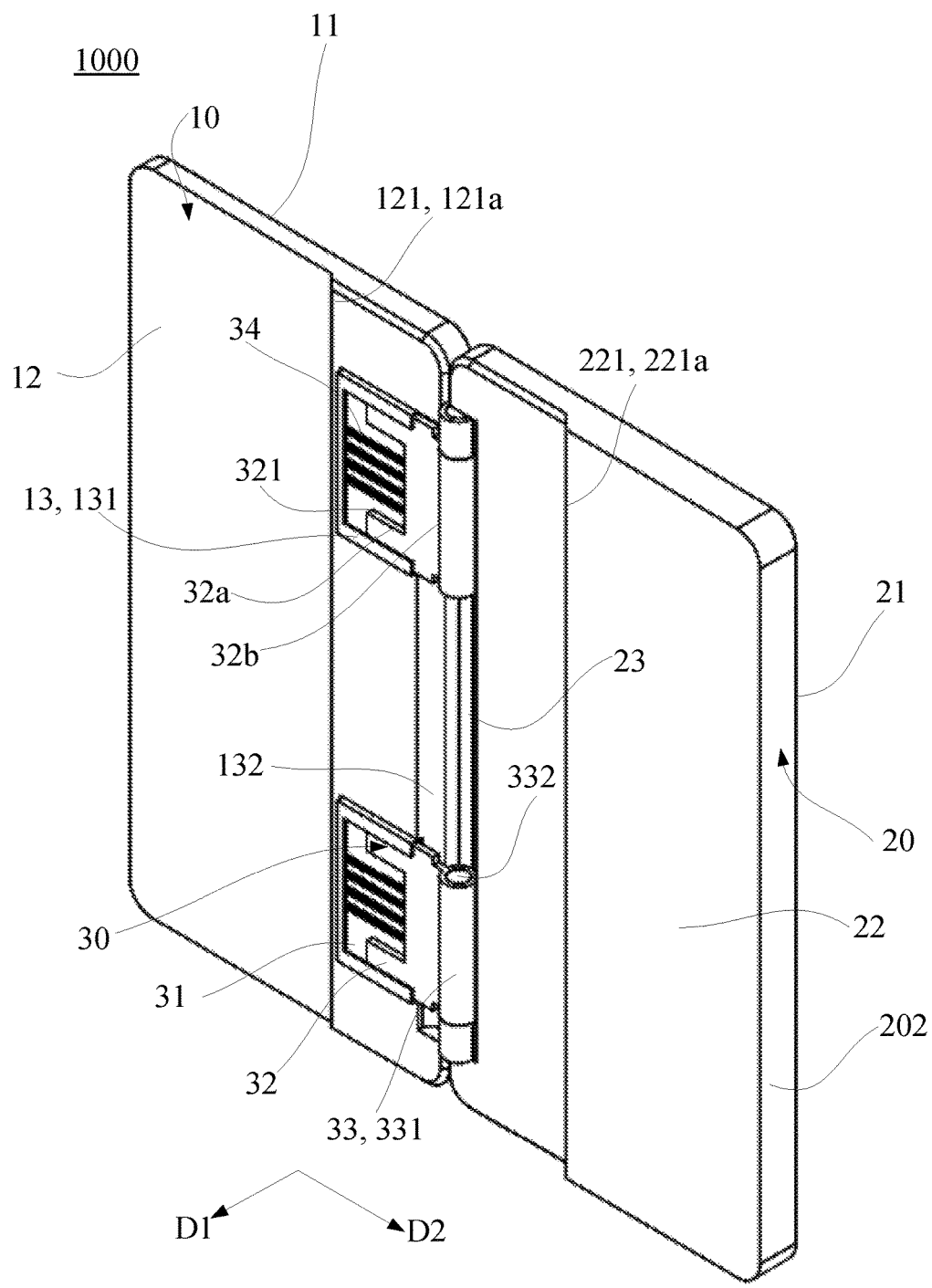
FIGS. 2A and 2B are perspective views of the portable electronic device of FIG. 1 in an unfolded status.
Figure 2B:
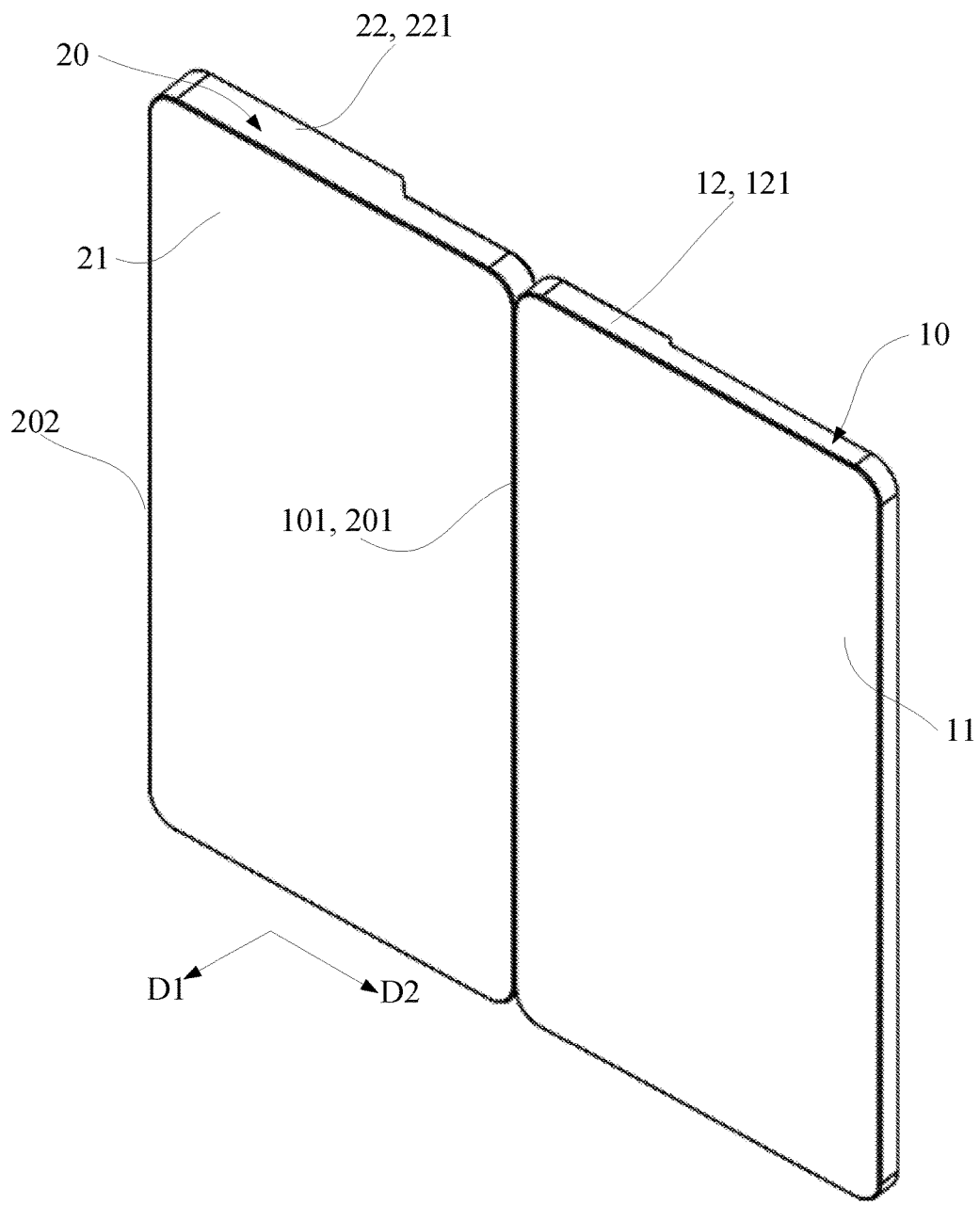
Figure 2C:
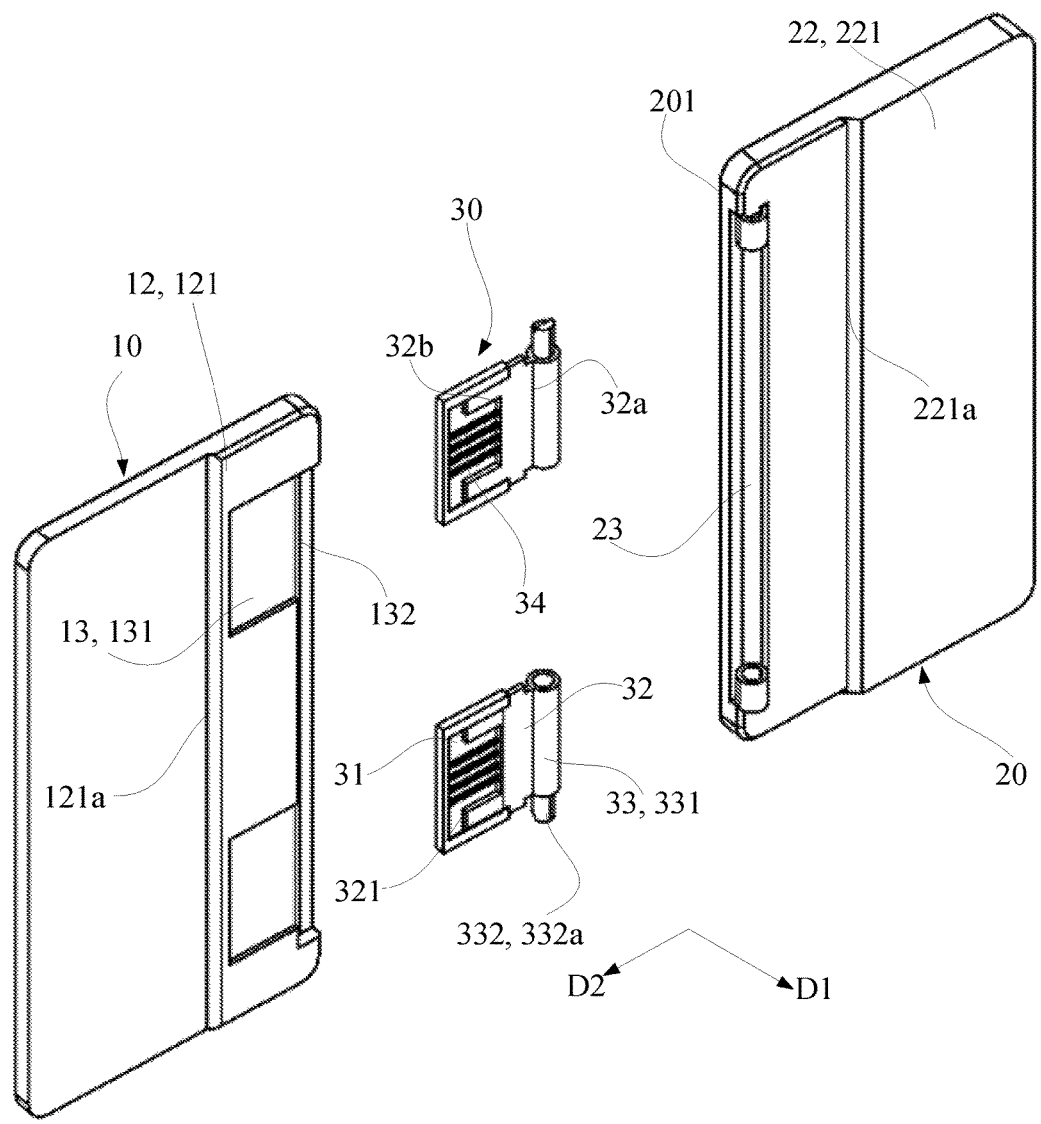
FIG. 2C is an exploded view of the portable electronic device of FIG. 1 in an unfolded status.

The hinge structure 30 is disposed in the first receiving groove 13 of the first unit 10 to pivotally connect the first unit 10 with the second unit 20. That is, by the hinge structure 30, the second unit 20 may rotate between the first position (in the folded status as shown in FIG. 1) and the second position (in the unfolded status as shown in FIG. 2A and FIG. 2B) relative to the first unit 10.

Figure 3B:
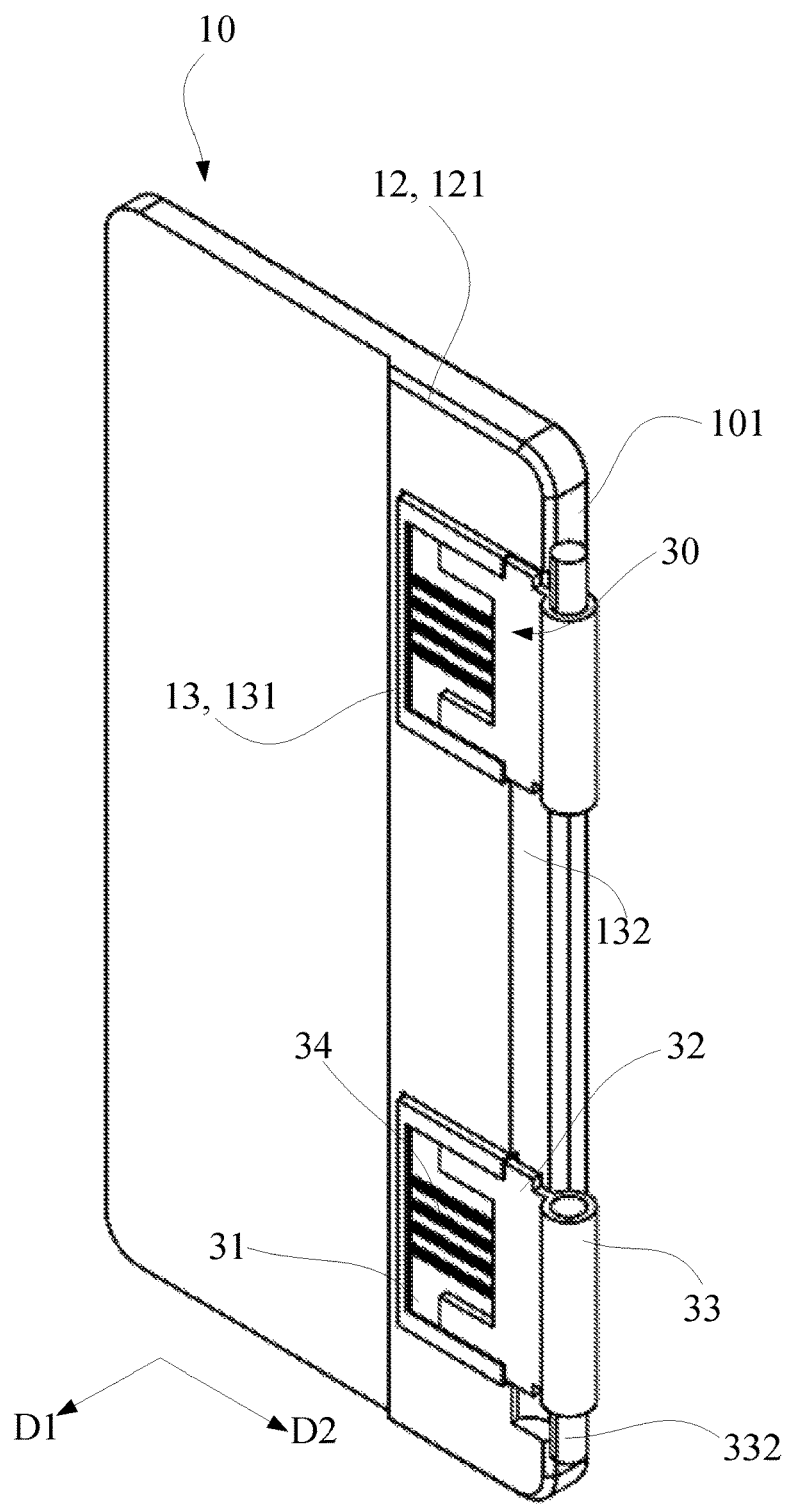

Specifically, with reference to FIGS. 3A and 3B, the hinge structure 30 comprises a fixing element 31, a sliding element 32 and a rotary element 33. The fixing element 31 is disposed and fixed in the first receiving region 131 of the first receiving groove 13 so that the overall hinge structure 30 is fixed on the first back portion 12 of the first unit 10. The sliding element 32 is slidably disposed on the fixing element 31. Preferably, the fixing element 31 may comprise a guide groove or a guide block to guide the sliding movement of the sliding element 32, limit the sliding range of the sliding element 32, and avoid the detachment of the sliding element 32 from the fixing element 31. Furthermore, the sliding movement of the sliding element 32 is a one-dimensional sliding movement along the width direction D2. A part of the fixing element 31 may be integrally formed with the first back portion 12, i.e., the first back portion 12 may be directly formed with a portion (e.g., the guide groove or the guide block) of the fixing element 31.

In this embodiment, the hinge structure 30 further comprises an elastic restoring element 34. The elastic restoring element 34 is elastic and may store an elastic restoring force under the action of a force. The elastic restoring element 34 has an end disposed on the fixing element 31 and the other end disposed on the inner side 32a (i.e., a side surface towards the fixing element 31) of the sliding element 32 to connect the fixing element 31 with the sliding element 32 to provide the sliding element 32 with an elastic restoring force towards the fixing element 31. That is, when the sliding element 32 slides away from the fixing element 31 in the width direction D2 under the action of an external force, the elastic restoring element 34 is stretched to store an elastic restoring force; and when the external force acting on the sliding element 32 is removed, the elastic restoring element 34 may pull the sliding element 32 back to the initial position thereof. In implementation, the elastic restoring element 34 may be constituted by a spring, an elastic piece or an elastic string. Moreover, the sliding element 32 may comprise a recess 321 on the inner side 32a thereof to receive the elastic restoring element 34.

The rotary element 33 is disposed on an outer side 32b (i.e., a side surface that can be exposed outside the fixing element 31) of the sliding element 32, and is disposed in the second receiving region 132 of the first receiving groove 13. In detail, the rotary element 33 may comprise a sleeve 331 and a rotary shaft 332. The sleeve 331 is disposed on the outer side 32b of the sliding element 32. Moreover, the sleeve 331 may be formed integrally with the sliding element 32 and extends from the outer side 32b of the sliding element 32. The rotary shaft 332 is pivoted into the sleeve 331 and has a protruding connecting end 332a to be connected with the second unit 20 so that the second unit 20 is pivoted to the rotary element 33 via the second back portion 22. The rotary element 33 may partly protrude outside the first receiving groove 13 in the thickness direction D1, and the protruding portion may be received in the second receiving groove 23 of the second unit 20. In other words, the rotary element 33 is partly received in the first receiving groove 13 and the second receiving groove 23 in the thickness direction D1. The second unit 20 may comprise a connecting element within the second receiving groove 23 to connect with the rotary shaft 332 of the rotary element 33.

Accordingly, the rotation of the second unit 20 relative to the first unit 10 will be selectively limited by the hinge structure 30. That is, when the portable electronic device 1000 is in the folded status, the sliding element 32 is received in the fixing element 31, and the rotary element 33 is within the first receiving groove 13 (not protruding outside the connecting side 101). At this point, the connecting side 201 of the second unit 20 is still overlapping with the first unit 10. When the second unit 20 is to be rotated, the connecting side 201 will abut against the first back portion 12 so that the second unit 20 cannot be further rotated. In order to rotate the second unit 20, firstly the second unit 20 and the first unit 10 need to slide relative to each other so that the sliding element 32 slides away from the fixing element 31 and the rotary element 33 is located outside the first receiving groove 13 (protruding outside the connecting side 101). At this point, the connecting side 201 of the second unit 20 protrudes outside the first unit 10, so the connecting side 201 does not abut against the first back portion 12 and the second unit 20 can rotate.

Additionally, the hinge structure 30 may further comprise a position fixing element (or a tightening element, not shown), and the position fixing element is disposed in the rotary element 33 (or connected to the rotary element 33) so that the rotary shaft 332 is fixedly positioned when the rotary shaft 332 rotates to multiple particular angles (e.g., 0 degree, 30 degrees, 60 degrees, 90 degrees, 120 degrees, 150 degrees and 180 degrees) or any angle relative to the sleeve 331. In this way, after rotating to the angle described above relative to each other, the first unit 10 and the second unit 20 may maintain an angle and will not rotate easily.

What is described above illustrates the components of the portable electronic device 1000 and corresponding configurations thereof. Next, the way to use the portable electronic device 1000 will be described. FIGS. 4A to 4D as well as FIGS. 1 and 2B, are schematic views illustrating the unfolding process of the portable electronic device 1000.

As shown in FIG. 1, when the portable electronic device 1000 is in the folded status, the first unit 10 and the second unit 20 are stacked together in the thickness direction D1, and the connecting sides 101 and 201 thereof are aligned or overlapping with each other. At this point, the sliding element 32 of the hinge structure 30 is located within the fixing element 31, and the elastic restoring element 34 connecting between the sliding element 32 and the fixing element 31 is slightly stretched (as shown in FIG. 3A). The pivot of the second unit 20 relative to the first unit 10 will be restrained. In this status, the user can still use the first unit 10 and the second unit 20 individually. Moreover, the rotary element 33 that is not protruding can be observed from the connecting sides 101 and 201 of the first unit 10 and the second unit 20. The rotary element 33 is not covered.

Figure 4A:
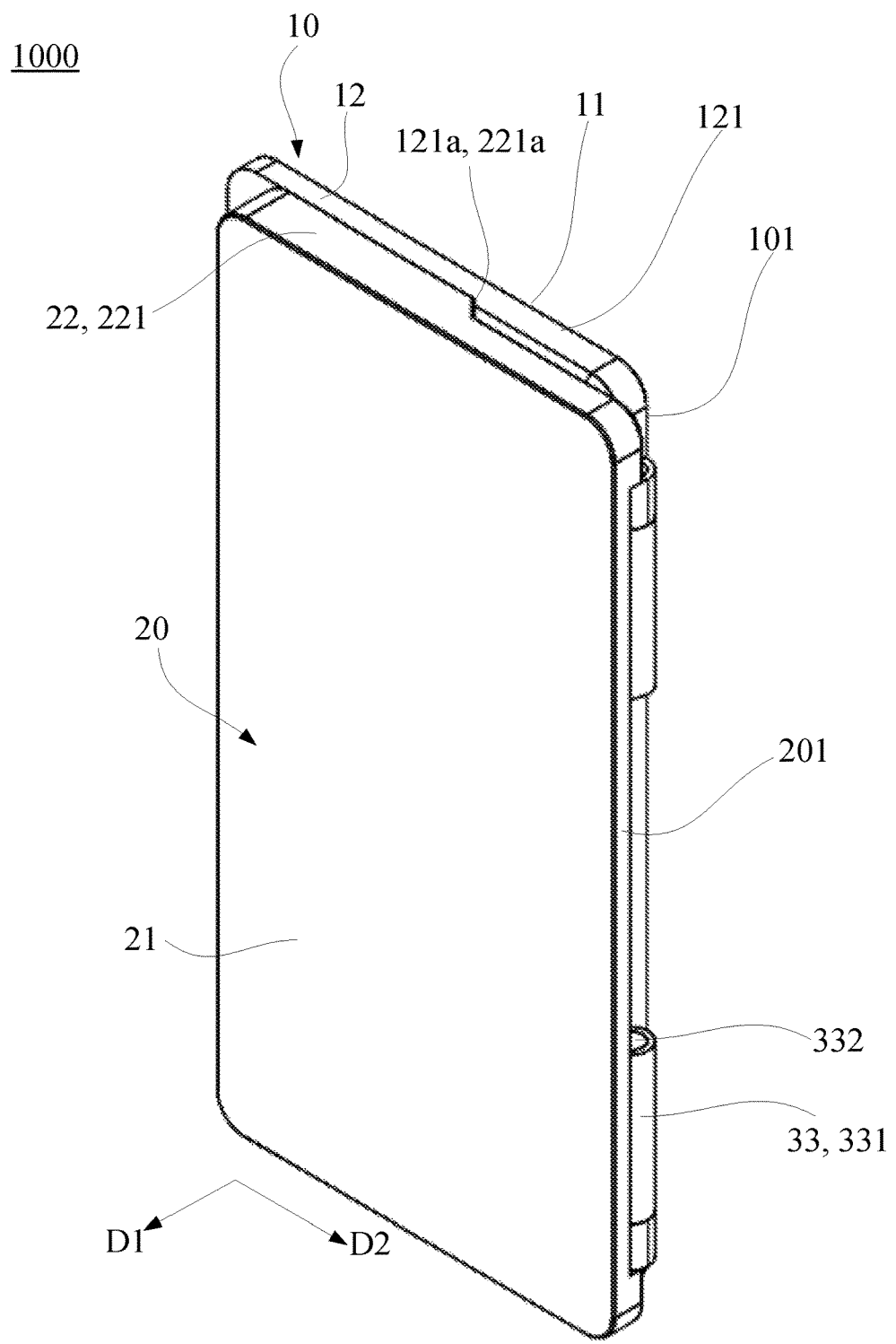
FIGS. 4A to 4D are schematic views illustrating the unfolding process of the portable electronic device of FIG. 1.

As shown in FIG. 4A, when a user is to unfold the portable electronic device 1000, the user first needs to exert a force on the second unit 20 so that the second unit 20 slides along the width direction D2 relative to the first unit 10. At this point, the sliding element 32 of the hinge structure 30 slides away from the fixing element 31 along the width direction D2 under the action of the external force, and the elastic restoring element 34 is stretched to store an elastic restoring force. After the second unit 20 slides for a particular distance relative to the first unit 10 (i.e., the first inclined surface 121a and the second inclined surface 221a abut against each other), the rotary element 33 protrudes outside the connecting side 101 from the second receiving region 132 of the first receiving groove 13 (as shown in FIG. 3B) so that the second unit 20 pivoted to the rotary element 33 can pivot relative to the first unit 10.

Figure 4B:
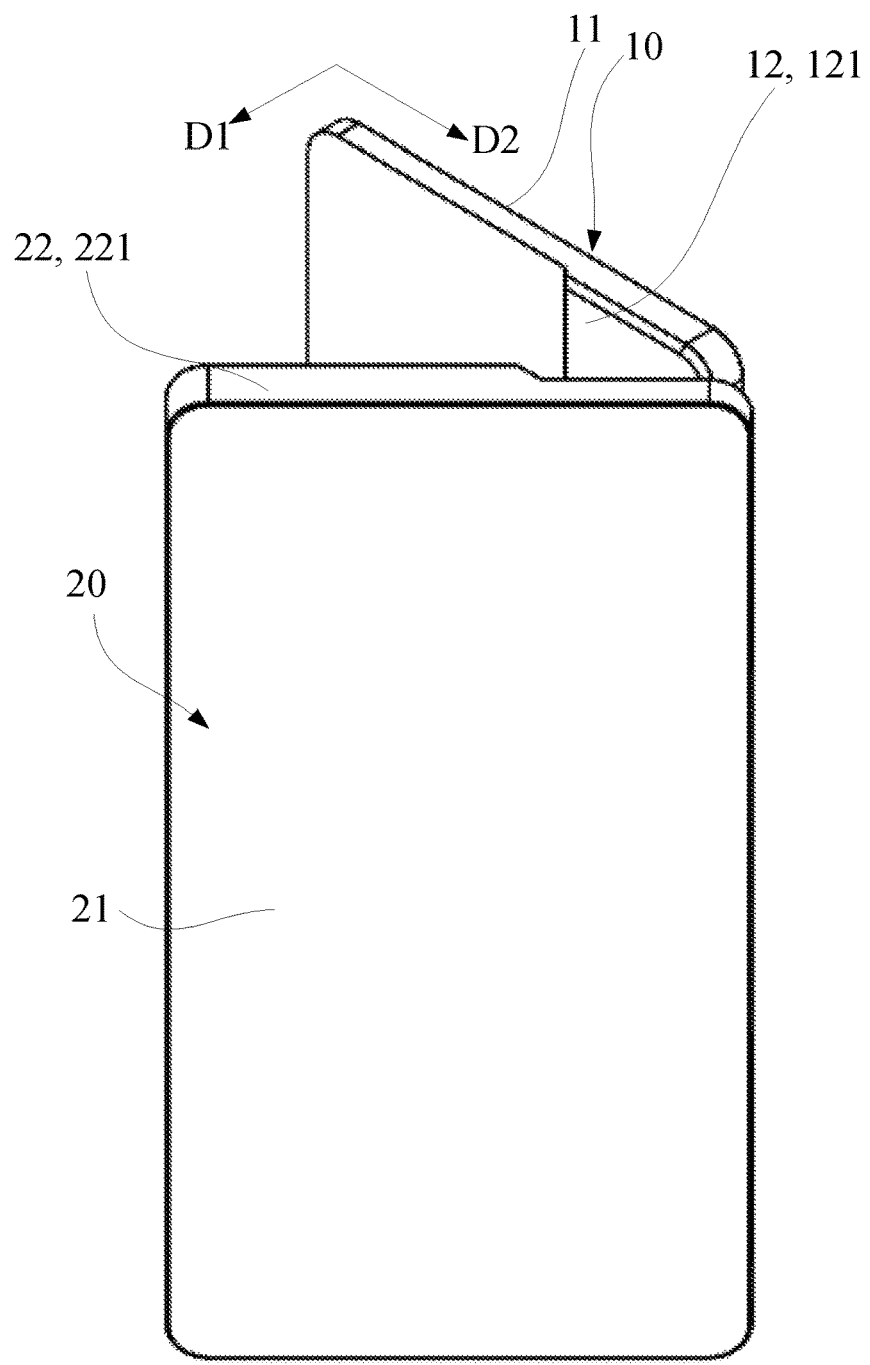
Figure 4C:
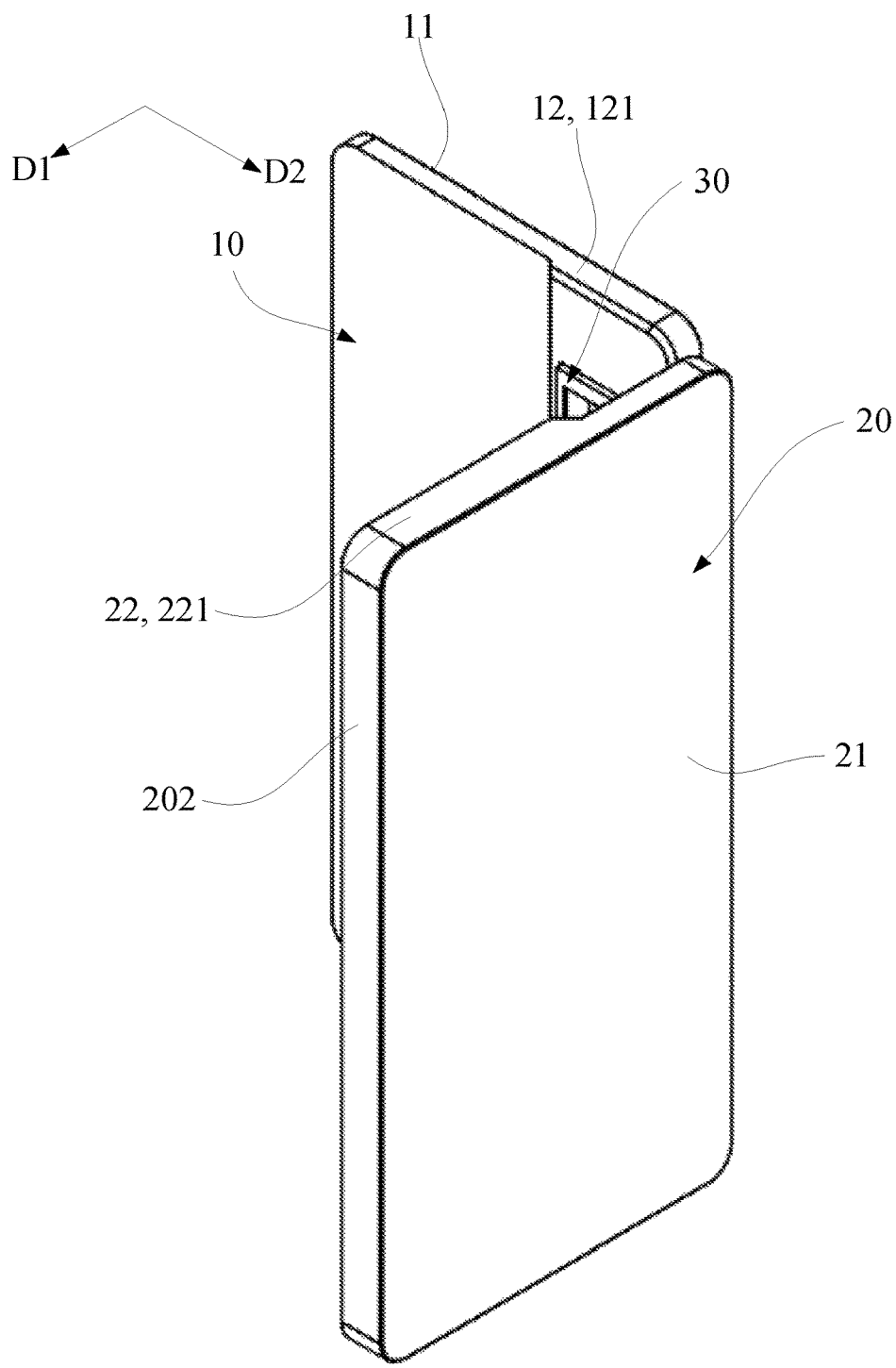
Figure 4D:
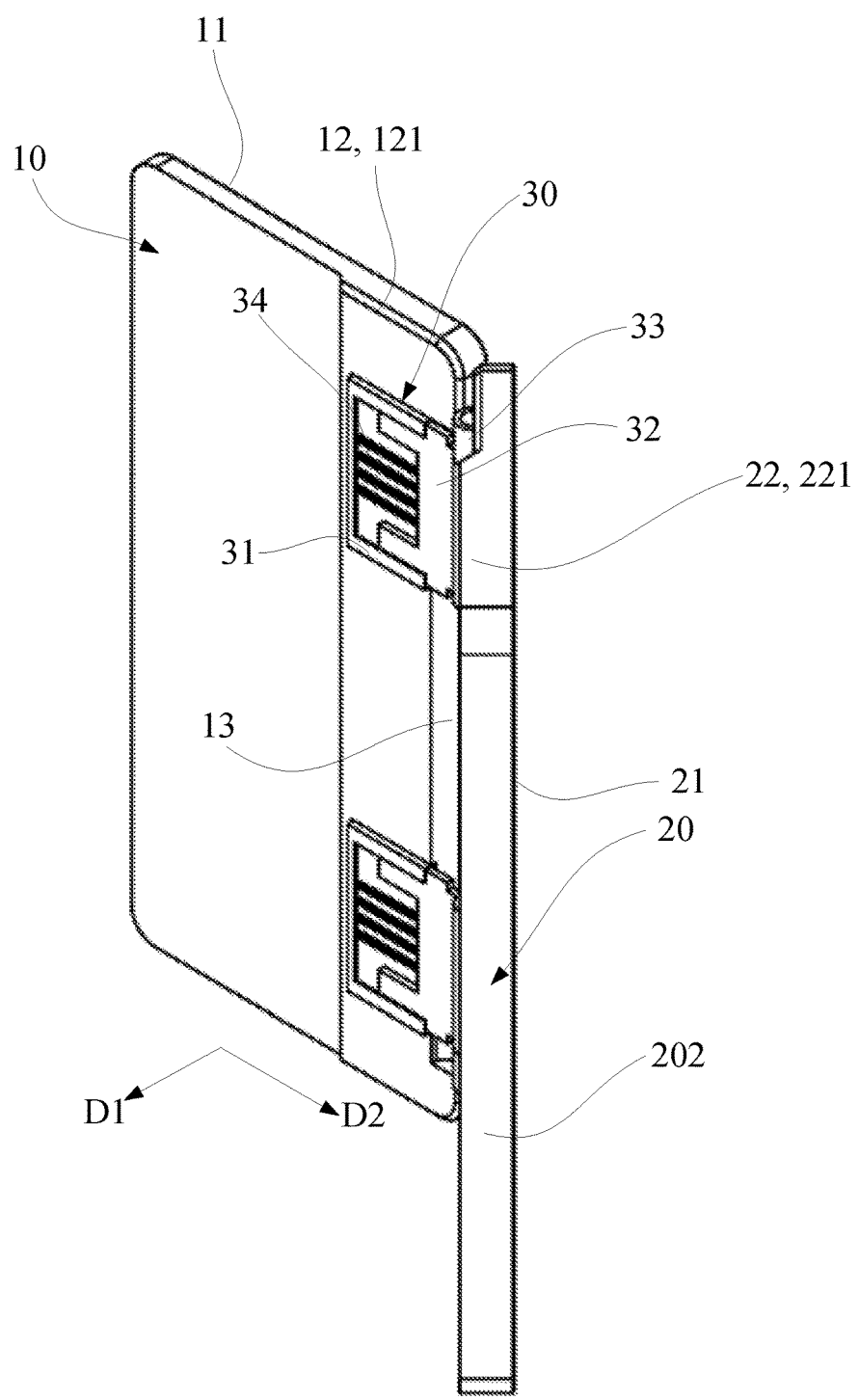

Next, as shown in FIGS. 4B to 4D, the second unit 20 may rotate to multiple angles relative to the first unit 10. As shown in FIGS. 2A and 2B, when the second unit 20 rotates to 180 degrees, the first display portion 11 is level with the second display portion 21. At this point, the second unit 20 will not be easily rotated due to the functioning of the position fixing element in the hinge structure 30. The elastic restoring force of the elastic restoring element 34 can also force the connecting sides 101 and 201 of the first unit 10 and the second unit 20 to abut against each other, so it is also hard for the second unit 20 to rotate. Moreover, the elastic restoring force of the elastic restoring element 34 can reduce the gap between the first display portion 11 and the second display portion 21 after being unfolded. When the portable electronic device 1000 is in the unfolded status, the user can operate and watch the first unit 10 and the second unit 20 at the same time.

In a particular embodiment, each of the first display portion 11 and the second display portion 21 may further comprise a curved display edge which is disposed at the connecting sides 101 and 201. Thus, in the status where the first display portion 11 and the second display portion 21 are level with each other (as shown in FIG. 2A), the user is less likely to feel that the image displayed together by the two display portions is disrupted by structures such as the frame of the display, thereby providing the user with a better viewing experience.

What is described above illustrates the technical contents of the portable electronic device 1000. Next, the technical contents of portable electronic devices according to other embodiments of the present invention will be described. Mutual reference and application may be made between technical contents of the portable electronic devices of various embodiments, so the same contents will be omitted or simplified in the description.

Figure 5A:
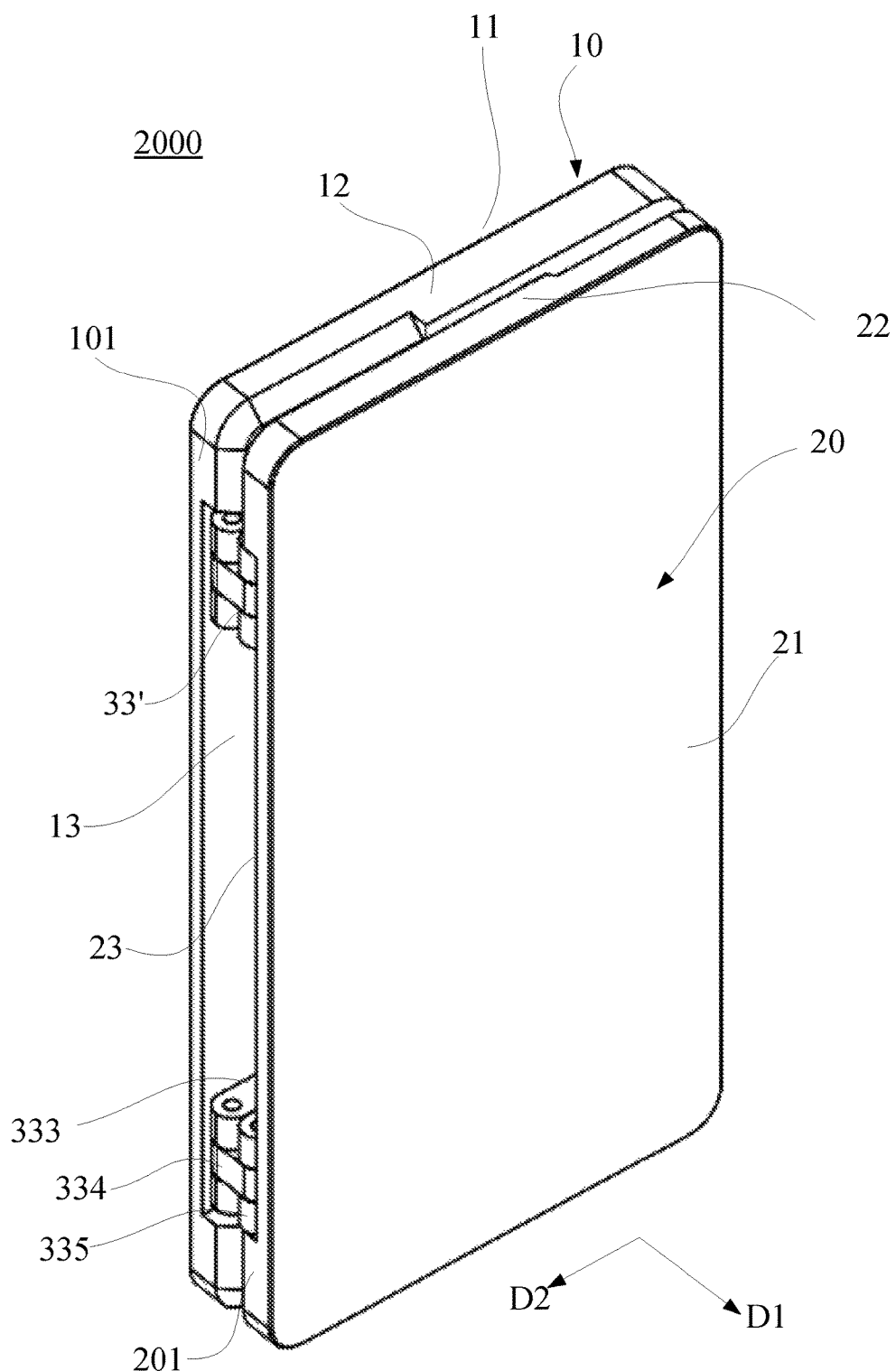
FIGS. 5A and 5B are respectively a perspective view and an exploded view of a portable electronic device in a folded status according to another preferred embodiment of the present invention.
Figure 5B:
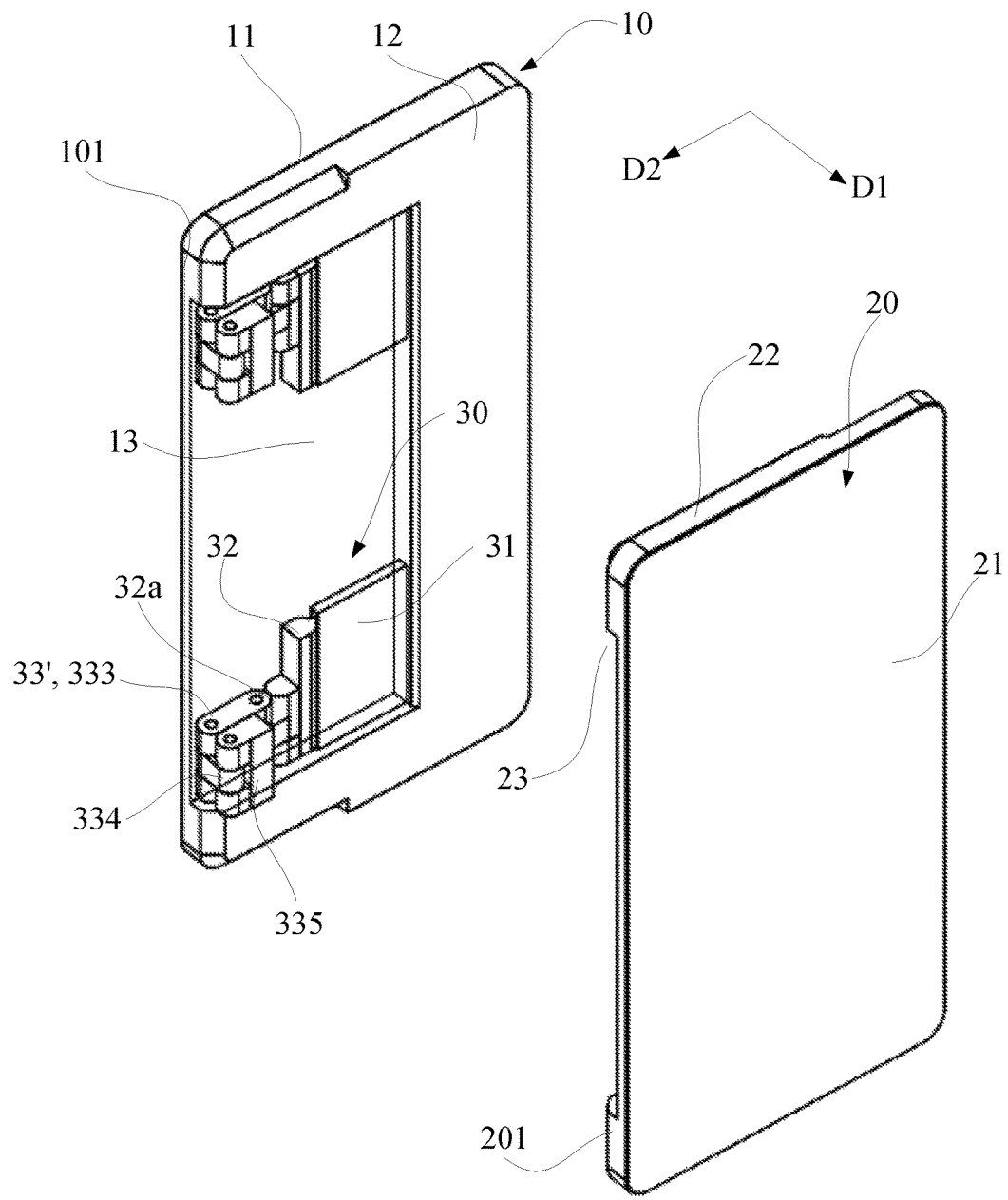

With reference to FIGS. 5A and 5B, in another embodiment, the second unit 20 of a portable electronic device 2000 may further rotate to, for example, 360 degrees in addition to rotating to 180 degrees relative to the first unit 10, thereby increasing the diversity in the usage. For this purpose, the hinge structure 30 in the portable electronic device 2000 may comprise another type of rotary element 33', and the rotary element 33' also will not protrude outside the connecting sides 101 or 201 when the portable electronic device 2000 is in the folded status.

Structurally, the rotary element 33' comprises a first rotary portion 333, a second rotary portion 334 and a fixing portion 335. The first rotary portion 333 has one side (an inner side) thereof pivoted to the outer side 32a of the sliding element 32 and the other side (an outer side) thereof pivoted to one side (an inner side) of the second rotary portion 334. The second rotary portion 334 has the other side (i.e., an outer side) thereof pivoted to the fixing portion 335, and then the fixing portion 335 is disposed in the second receiving groove 23 of the second unit 20. More specifically, the pivot connection between the first rotary portion 333 and the sliding element 32, the pivot connection between the first rotary portion 333 and the second rotary portion 334, as well as the pivot connection between the second rotary portion 334 and the fixing portion 335 can all be achieved by a pin (a rotary shaft) passing through two components. Additionally, in the folded status, the first rotary portion 333 and the second rotary portion 334 may be arranged perpendicular to each other, and the second rotary portion 334 may be stacked with the fixing portion 335. On the other hand, another side of the second rotary portion 334 may also be directly pivoted to the second back portion 22 without going through the fixing portion 335.

Next, the unfolding and folding process of the portable electronic device 2000 will be described.

Figure 6A:
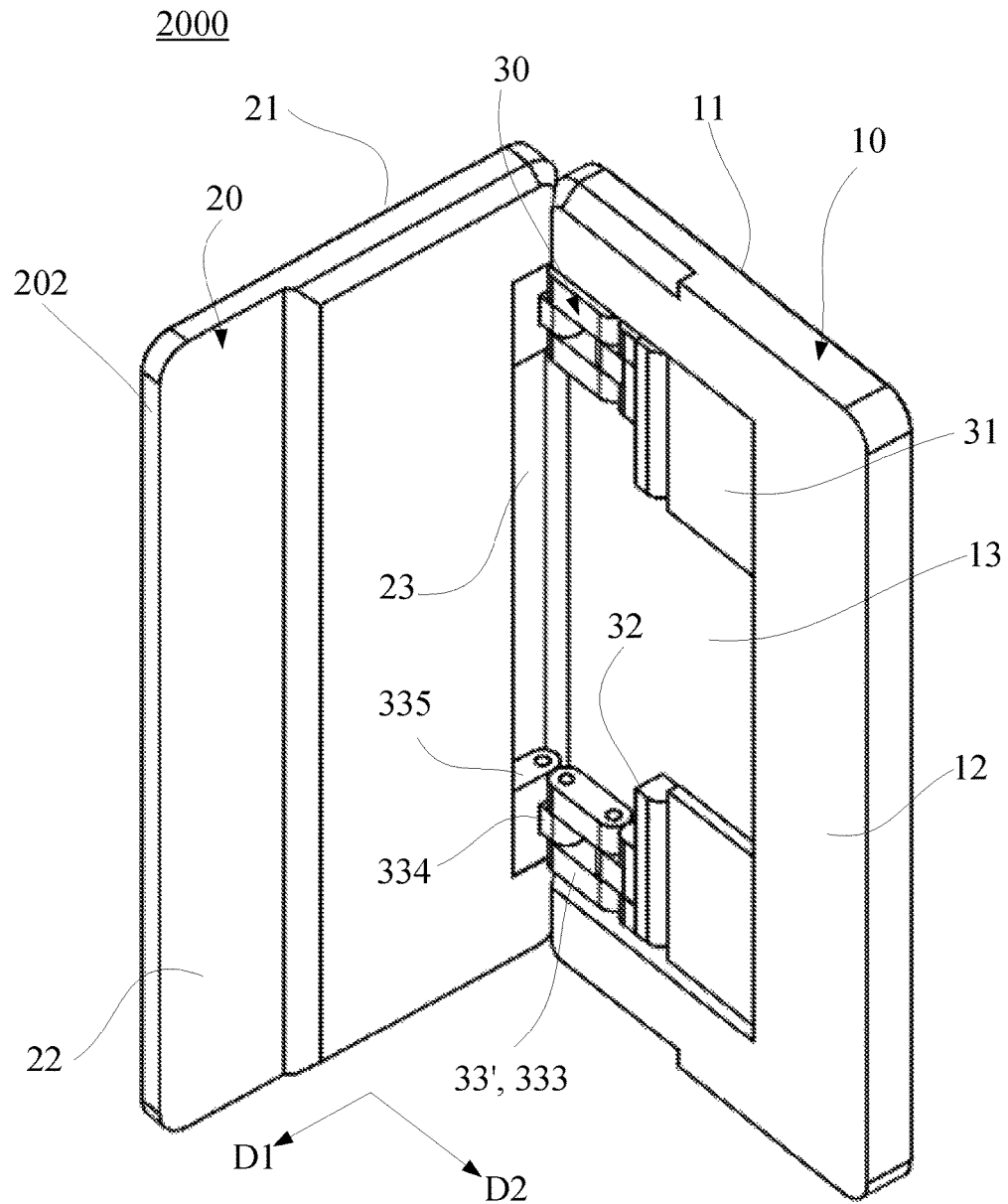
FIGS. 6A to 6D are schematic views illustrating the unfolding process of the portable electronic device of FIG. 5A.
Figure 6B:
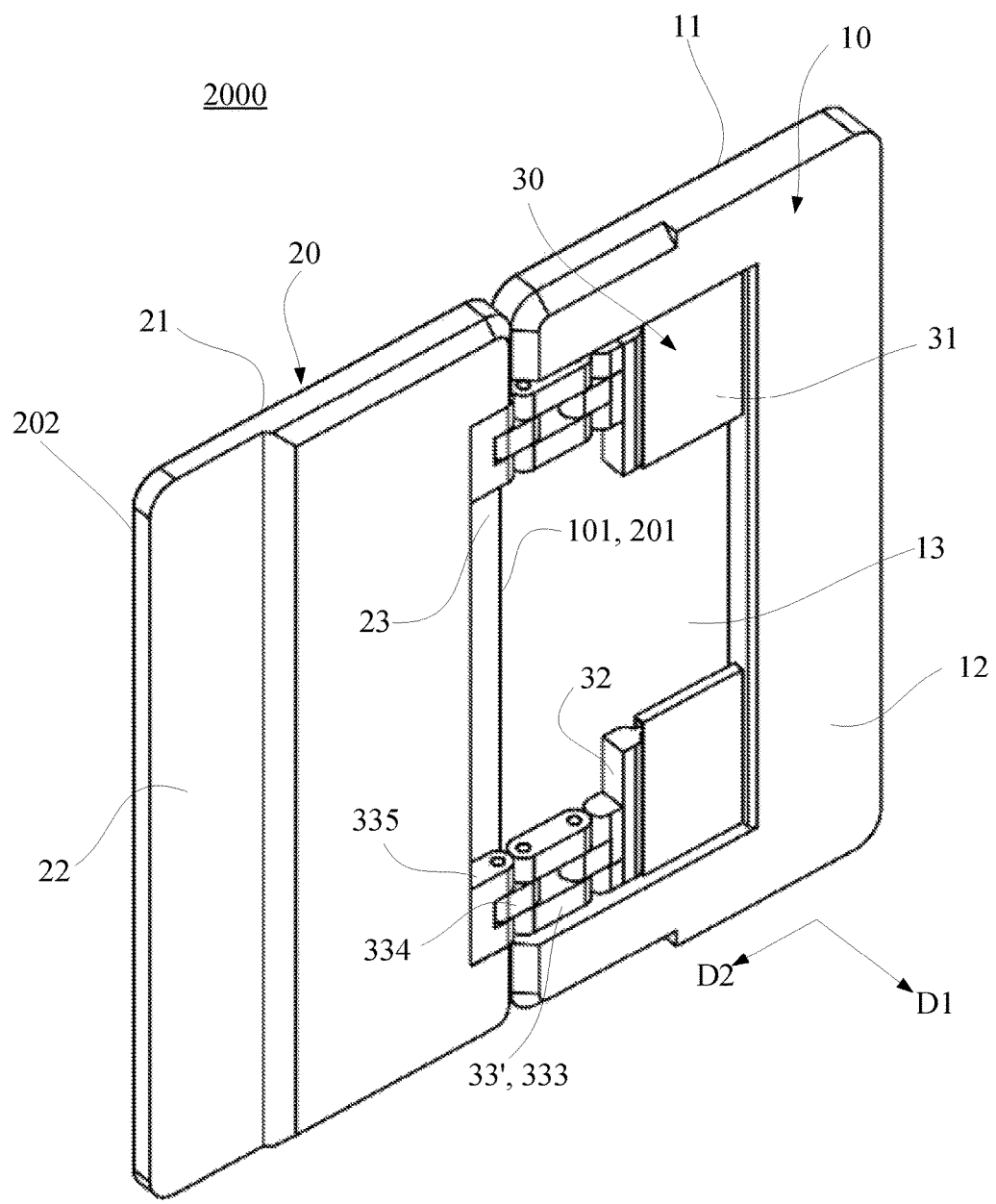

As shown in FIGS. 6A and 6B, with the hinge structure 30, the second unit 20 and the first unit 10 may rotate to 0~180 degrees relative to each other (and may maintain at any angle theretween, e.g., 90 degrees). During the rotating process, the second rotary portion 334 rotates relative to the first rotary portion 333, the second rotary portion 334 rotates relative to the fixing portion 335 (the second back portion 22), but the first rotary portion 333 may not need to rotate relative to the sliding element 32. Furthermore, the sliding element 32 does not slide relative to the fixing element 31. The first rotary portion 333 does not protrude outside the first receiving groove 13.

Figure 6C:
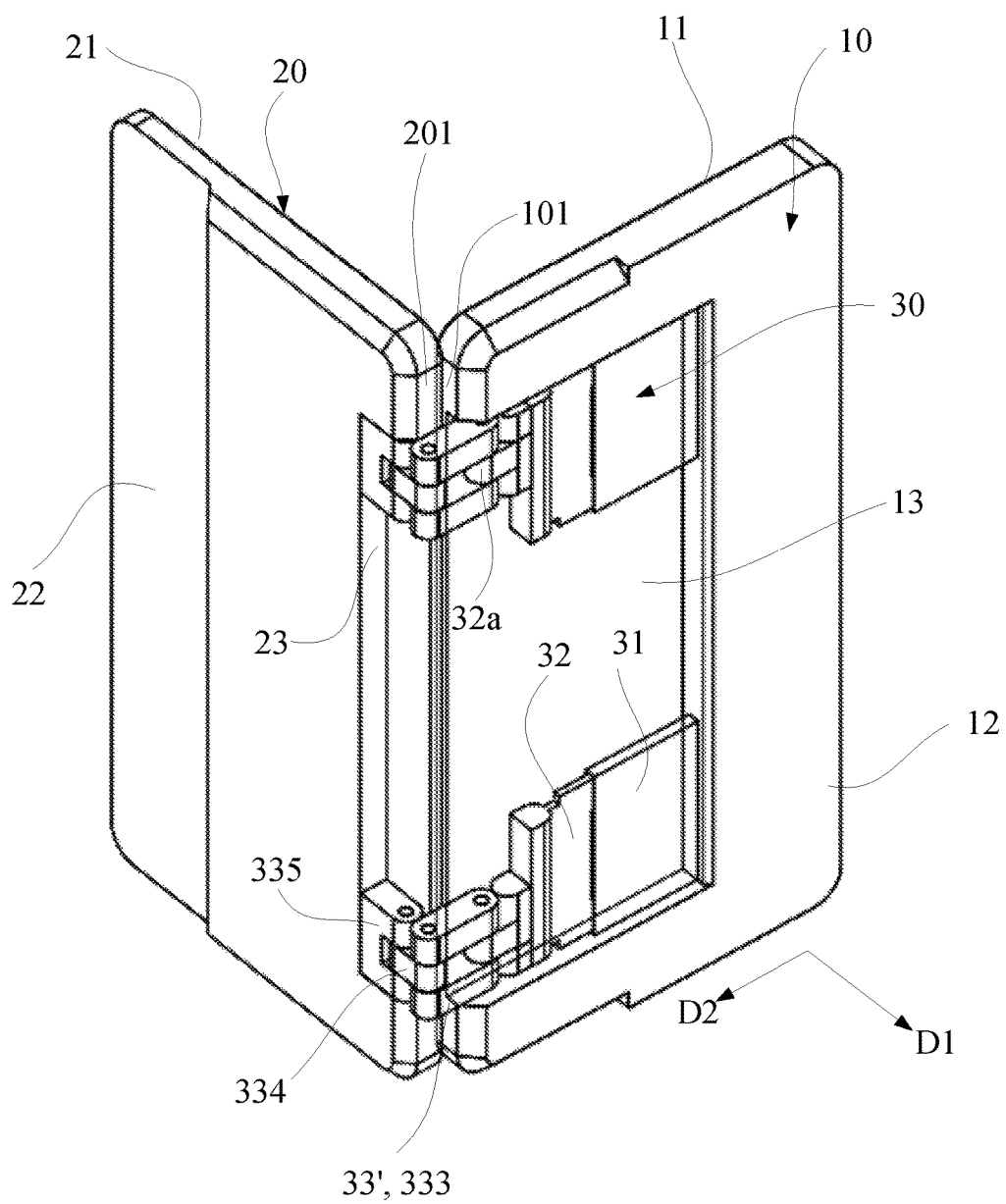
Figure 6D:
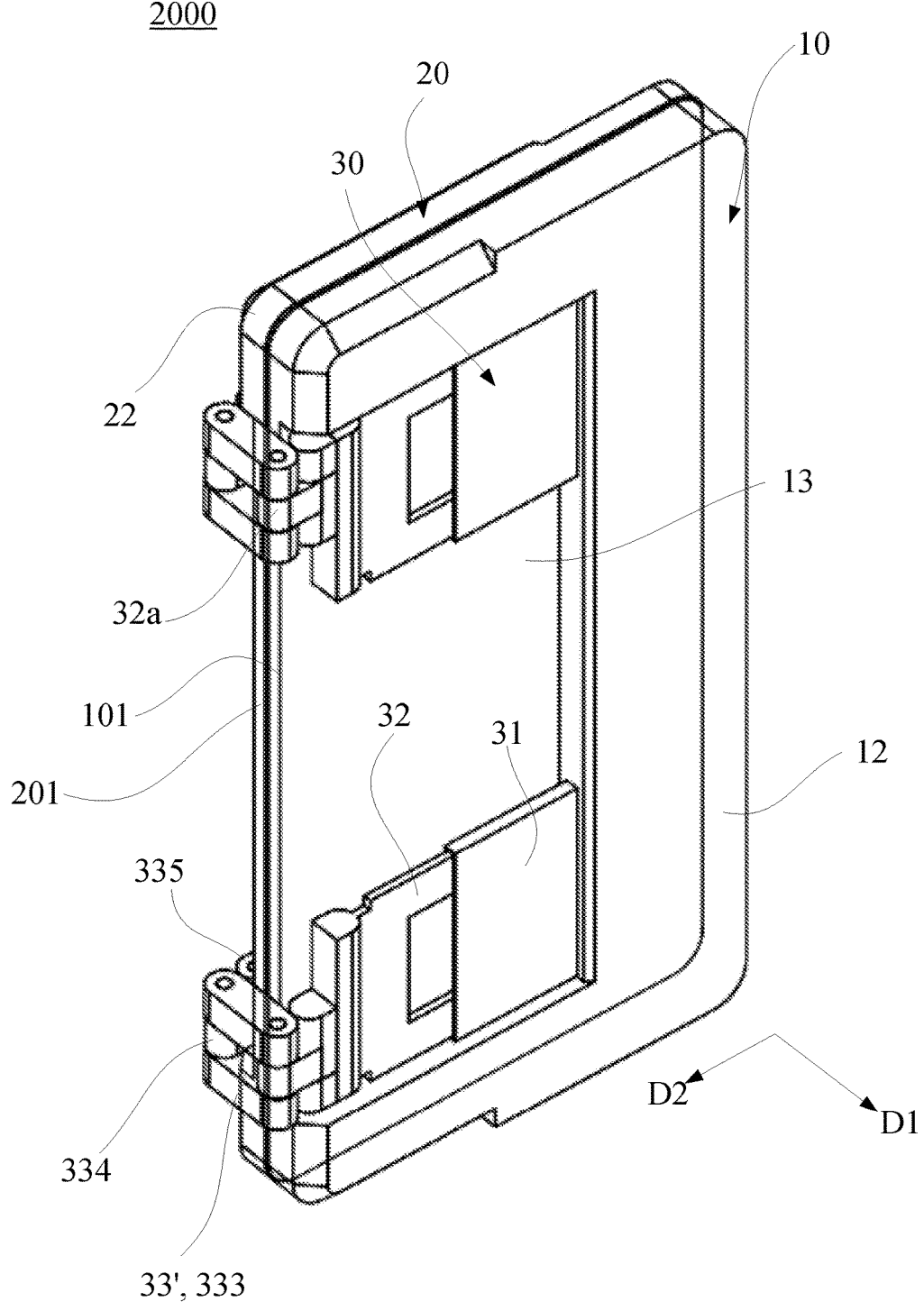

As shown in FIGS. 6C and 6D, the second unit 20 and the first unit 10 may further rotate to 180~360 degrees relative to each other (and may maintain at any angle theretween, e.g., 270 degrees). During the process of rotating from 180 degrees to 270 degrees, the sliding element 32 slides relative to the fixing element 31 so that the first rotary portion 333 gradually protrudes outside the first receiving groove 13 (along the width direction D2), but the first rotary portion 333 may not need to rotate relative to the sliding element 32. At this point, the two connecting sides 101 and 201 do not abut against each other. During the process of rotating from 270 degrees to 360 degrees, the sliding element 32 slides relative to the fixing element 31 so that the outer side 32a of the sliding element 32 protrudes outside the first receiving groove 13, thereby enabling the first rotary portion 333 to rotate relative to the sliding element 32 without being limited by the first back portion 12. At this point, the first rotary portion 333 may abut against the connecting sides 101 and 201.

Figure 6E:
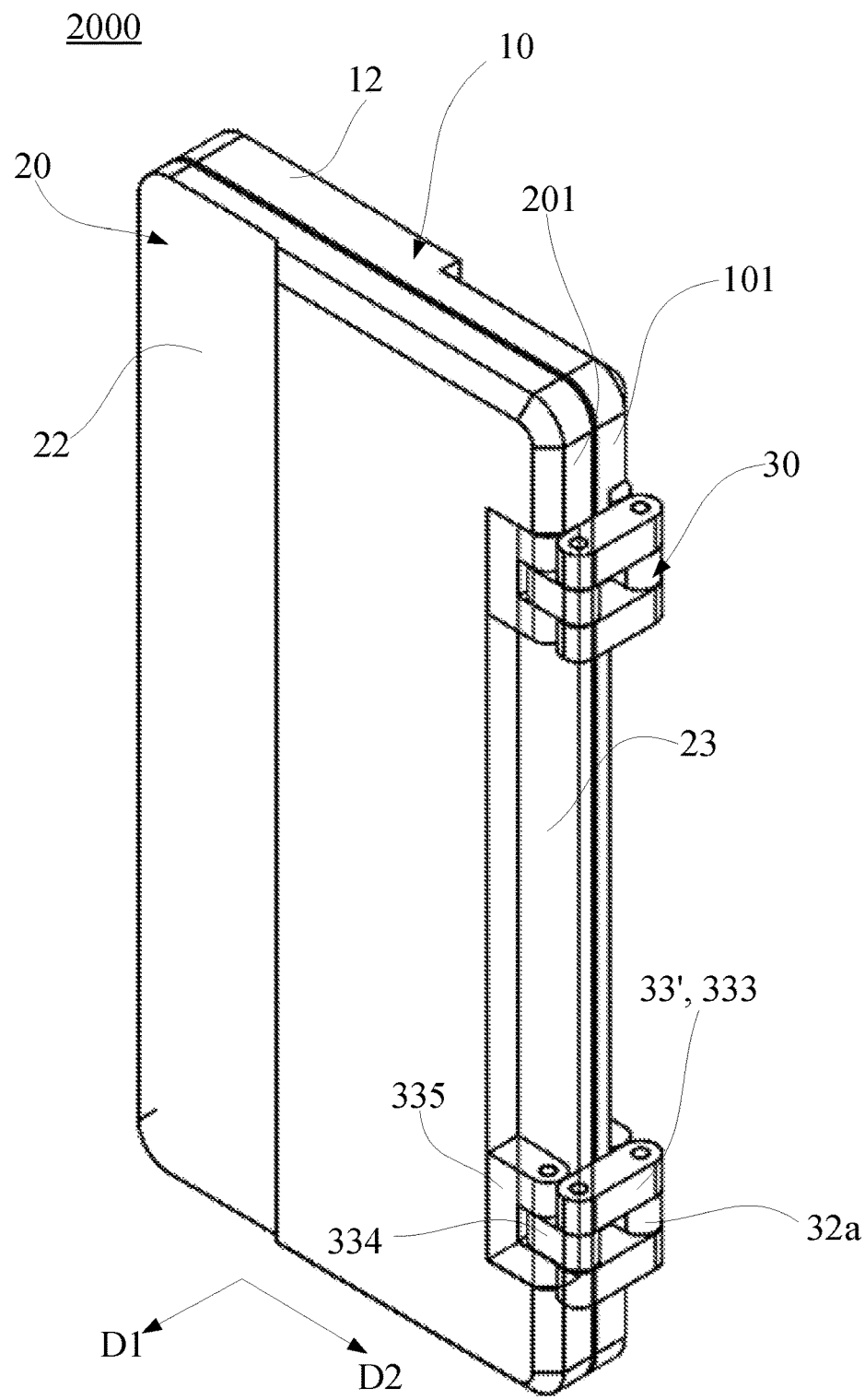
FIG. 6E is a schematic view of the portable electronic device of FIG. 6D from another perspective.

Accordingly, the second unit 20 may rotate for two stages relative to the first unit 10, thereby presenting two kinds of stacking configurations. That is, the first unit 10 and the second unit 20 not only can be stacked together with the first back portion 12 and the second back portion 22 facing each other (as shown in FIG. 5A), but also can be stacked together with the first display portion 11 and the second display portion 21 facing each other (as shown in FIGS. 6D and 6E, the first display portion 11 and the second display portion 21 are covered) to protect the first display portion 11 and the second display portion 21.

According to the above descriptions, the portable electronic device provided in the present invention may at least have the following technical features:

1. In the folded status, the rotary element of the hinge structure will not protrude outside the first unit and the second unit (or only partly protrudes outside the first unit and the second unit) in the width direction, so the overall width of the portable electronic device may be equal to or slightly larger than the width of the first unit and the second unit.

2. Only after the first unit and the second unit slide relative to each other can the rotary element of the hinge structure protrude outside the first unit so that the two units can rotate relative to each other in the unfolded status. Thus, as compared to the conventional unfolding process which only requires the rotating step, the portable electronic device of the present invention additionally comprises a sliding step to prevent the first unit and the second unit from being unfolded due to unintentional rotation.

3. The elastic restoring element of the hinge structure can reduce the gap between the first unit and the second unit after the two units are arranged side by side, thereby providing the user with a better viewing experience when the user is watching the image commonly displayed by the first display portion and the second display portion.

4. The first unit and the second unit can further rotate to another storage status from the unfolded status so that the first display portion and the second display portion are covered and not exposed to the outside, thereby preventing the first display portion and/or the second display portion from being touched accidentally by the user or an object in the storage status.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A portable electronic device, comprising:
   a first unit, comprising a first display portion, a first back portion and a first receiving groove which is disposed on the first back portion;
   a second unit, comprising a second display portion and a second back portion, wherein the second back portion is selectively stacked with the first back portion; and
   a hinge structure, disposed in the first receiving groove of the first unit and comprising a fixing element, a sliding element and a rotary element, wherein the fixing element is disposed in the first receiving groove, the sliding element is slidably disposed on the fixing element, and the rotary element is disposed on an outer side of the sliding element, wherein the second unit is pivoted to the rotary element via the second back portion to enable the portable electronic device to be in one of a folded status and a unfolded status;
   wherein when the portable electronic device is in the folded status, the first back portion and the second back portion are stacked together, and a connecting side of the first unit is separate from a connecting side of the second unit along a width direction of the portable electronic device;
   wherein when portable electronic device is in the unfolded status, the first unit and the second unit are arranged side by side, the rotary element protrudes outside the connecting side of the first unit, and the connecting side of the first unit abuts on the connecting side of the second unit along the width direction.

2. The portable electronic device of claim 1, wherein the hinge structure further comprises an elastic restoring element having an end disposed on the fixing element and the other end disposed on an inner side of the sliding element to provide the sliding element with an elastic restoring force towards the fixing element.

3. The portable electronic device of claim 2, wherein the elastic restoring element comprises a spring, an elastic piece or an elastic string.

4. The portable electronic device of claim 1, wherein the first back portion comprises a first raised region on which the first receiving groove is disposed, the second back portion comprises a second raised region, and when the first back portion and the second back portion are stacked together, the first raised region and the second raised region are disposed adjacent to each other to define a slide space therebetween.

5. The portable electronic device of claim 1, wherein the rotary element comprises a sleeve and a rotary shaft, the sleeve is disposed on the outer side of the sliding element, and the rotary shaft is pivoted into the sleeve.

6. The portable electronic device of claim 1, wherein the rotary element comprises a first rotary portion and a second rotary portion, the first rotary portion has one side thereof pivoted to the outer side of the sliding element and another side thereof pivoted to one side of the second rotary portion, and the second rotary portion has another side thereof pivoted to the second back portion.

7. The portable electronic device of claim 1, wherein the fixing element comprises a guide groove or a guide block to guide the sliding movement of the sliding element.

8. The portable electronic device of claim 1, wherein the first receiving groove comprises a first receiving region and a second receiving region connected with each other, the fixing element is disposed in the first receiving region and the rotary element is selectively disposed in the second receiving region.

9. The portable electronic device of claim 1, wherein the second unit further comprises a second receiving groove disposed on the second back portion, and the rotary element is partly disposed in the second receiving groove.

10. The portable electronic device of claim 1, wherein the first display portion and the second display portion each comprise a curved display edge.

11. A portable electronic device, comprising:
    a first unit, comprising a first display portion, a first back portion and a first receiving groove which is disposed on the first back portion;
    a second unit, comprising a second display portion and a second back portion, wherein the second back portion is selectively stacked with the first back portion; and
    a hinge structure, disposed in the first receiving groove of the first unit and comprising a fixing element, a sliding element and a rotary element, wherein the fixing element is disposed in the first receiving groove, the sliding element is slidably disposed on the fixing element, and the rotary element is disposed on an outer side of the sliding element, wherein the second unit is pivoted to the rotary element via the second back portion,
    wherein the first back portion comprises a first raised region on which the first receiving groove is disposed, the second back portion comprises a second raised region, and when the first back portion and the second back portion are stacked together, the first raised region and the second raised region are disposed adjacent to each other to define a slide space therebetween, and
    wherein the first raised region comprises a first inclined surface and the second raised region comprises a second inclined surface, and when the first back portion and the second back portion are stacked together, the first inclined surface and the second inclined surface face each other.

* * * * *